US010230741B2

(12) United States Patent
Engel et al.

(10) Patent No.: US 10,230,741 B2
(45) Date of Patent: Mar. 12, 2019

(54) METHOD AND A DEVICE FOR SECURING A SIGNALLING SYSTEM NO. 7 INTERFACE

(71) Applicant: GSMK Gesellschaft fuer sichere Mobile Kommunikation mbH, Berlin (DE)

(72) Inventors: Tobias Engel, Berlin (DE); Holger Freyther, Berlin (DE)

(73) Assignee: GSMK GESELLSCHAFT FUER SICHERE MOBILE KOMMUNIKATION MBH (DE)

( * ) Notice: Subject to any disclaimer, the term of this patent is extended or adjusted under 35 U.S.C. 154(b) by 316 days.

(21) Appl. No.: 14/955,721

(22) Filed: Dec. 1, 2015

(65) Prior Publication Data

US 2016/0156647 A1 Jun. 2, 2016

(30) Foreign Application Priority Data

Dec. 2, 2014 (DE) .................. 10 2014 117 713

(51) Int. Cl.
*H04L 29/06* (2006.01)
*H04Q 3/00* (2006.01)
*H04W 12/12* (2009.01)
*H04W 8/04* (2009.01)
*H04W 8/06* (2009.01)

(52) U.S. Cl.
CPC ........ *H04L 63/1416* (2013.01); *H04L 63/166* (2013.01); *H04Q 3/0025* (2013.01); *H04W 8/04* (2013.01); *H04W 8/06* (2013.01); *H04W 12/12* (2013.01); *H04L 63/0227* (2013.01)

(58) Field of Classification Search
CPC .................................................. H04Q 3/0025

USPC ........................................................ 726/23
See application file for complete search history.

(56) References Cited

U.S. PATENT DOCUMENTS

| 5,345,595 | A | 9/1994 | Johnson |
| 6,308,276 | B1* | 10/2001 | Ashdown ............ H04L 63/0227 726/11 |
| 6,889,328 | B1 | 5/2005 | Sanchez Herrero et al. |
| 7,577,431 | B2* | 8/2009 | Jiang ........................ H04W 8/26 455/413 |
| 8,326,286 | B2* | 12/2012 | Pan .......................... H04W 8/06 370/352 |
| 2001/0046856 | A1 | 11/2001 | McCann |
| 2005/0232236 | A1 | 10/2005 | Allison et al. |
| 2010/0105355 | A1 | 4/2010 | Nooren |
| 2011/0014939 | A1 | 1/2011 | Ravishankar |

(Continued)

FOREIGN PATENT DOCUMENTS

| WO | 2007041346 A2 | 4/2014 |
| WO | 2014187696 A1 | 11/2014 |

OTHER PUBLICATIONS

European Search Report dated Nov. 5, 2016.
German Examination Report dated Jul. 30, 2015.

*Primary Examiner* — Khalil Naghdali
(74) *Attorney, Agent, or Firm* — Gerald E. Hespos; Michael J. Porco; Matthew T. Hespos (57) ABSTRACT

A method is provided for securing a Signalling System No. 7 interface, SS7 interface, of a system, via which access to a local mobile radiocommunications network is carried out, in relation to an external system. The method protects the SS7 network access points of telecommunication providers from SS7/MAP attacks by detecting and filtering these attacks.

12 Claims, 6 Drawing Sheets

(56) References Cited

U.S. PATENT DOCUMENTS

2011/0041176 A1    2/2011   Maria
2013/0095793 A1    4/2013   Nooren

* cited by examiner

| OSI-LAYERS | SS7 | | | | | |
|---|---|---|---|---|---|---|
| LAYER 7 - APPLICATION | INAP | CAP | MAP | OMAP | (ISUP) | USER PARTS: |
| LAYER 6 - PRESENTATION | | | | | | |
| LAYER 5 - SESSION | | TCAP | | | | TUP, ISUP |
| LAYER 4 - TRANSPORT | SCCP | | | | | |
| LAYER 3 - NETWORK | MTP LEVEL 3 OR M3UA | | | | | |
| LAYER 2 - DATA | MTP LEVEL 2 OR M2UA | | | | | |
| LAYER 1 - PHYSICAL | MTP LEVEL 1 OR IP | | | | | |

*FIG. 9*

```
SIGNALLING CONNECTION CONTROL PART
    MESSAGE TYPE: UNITDATA (0x09)
    .... 0001 = CLASS: 0x01
    1000 .... = MESSAGE HANDLING: RETURN MESSAGE ON ERROR (0x08)
    POINTER TO FIRST MANDATORY VARIABLE PARAMETER: 3
    POINTER TO SECOND MANDATORY VARIABLE PARAMETER: 14
    POINTER TO THIRD MANDATORY VARIABLE PARAMETER: 24
    CALLED PARTY ADDRESS (11 BYTES)
        ADDRESS INDICATOR
            0... .... = RESERVED FOR NATIONAL USE: 0x00
            .0.. .... = ROUTING INDICATOR: ROUTE ON GT (0x00)
            ..01 00.. = GLOBAL TITLE INDICATOR: TRANSLATION TYPE,
NUMBERING PLAN, ENCODING SCHEME, AND NATURE OF ADDRESS INDICATOR
INCLUDED (0x04)
            .... ..1. = SUBSYSTEM NUMBER INDICATOR: SSN PRESENT
(0x01)
            .... ...0 = POINT CODE INDICATOR: POINT CODE NOT PRESENT
(0x00)
        SUBSYSTEM NUMBER: MSC (MOBILE SWITCHING CENTER) (8)
```

*FIG. 10*

```
            (LINKED TO TCAP, TCAP SSN LINKED TO GSM_MAP)
            GLOBAL TITLE 0x4 (9 BYTES)
                TRANSLATION TYPE: 0x00
                0001 .... = NUMBERING PLAN: ISDN/TELEPHONY (0x01
                .... 0001 = ENCODING SCHEME: BCD, ODD NUMBER OF DIGITS
(0x01)
                .000 0100 = NATURE OF ADDRESS INDICATOR: INTERNATIONAL
NUMBER (0x04)
                CALLED PARTY DIGITS: 62811006827
                    CALLED OR CALLING GT DIGITS: 62811006827
                    NUMBER OF CALLED PARTY DIGITS: 11
                    COUNTRY CODE: 62 INDONESIA (REPUBLIC OF) (LENGTH 2)
        CALLING PARTY ADDRESS (10 BYTES)
            ADDRESS INDICATOR
                0... .... = RESERVED FOR NATIONAL USE: 0x00
                .0.. .... = ROUTING INDICATOR: ROUTE ON GT (0x00)
                ..01 00.. = GLOBAL TITLE INDICATOR: TRANSLATION TYPE,
NUMBERING PLAN, ENCODING SCHEME, AND NATURE OF ADDRESS INDICATOR
INCLUDED (0x04)
                .... ..1. = SUBSYSTEM NUMBER INDICATOR: SSN PRESENT
(0x01)
                .... ...0 = POINT CODE INDICATOR: POINT CODE NOT PRESENT
 (0x00)
            SUBSYSTEM NUMBER: HLR (HOME LOCATION REGISTER) (6)
            [LINKED TO TCAP, TCAP SSN LINKED TO GSM_MAP]
            GLOBAL TITLE 0x4 (8 BYTES)
                TRANSLATION TYPE: 0x00
                0001 .... = NUMBERING PLAN: ISDN/TELEPHONY (0x01)
                .... 0010 = ENCODING SCHEME: BCD, EVEN NUMBER OF DIGITS
(0x02)
                .000 0100 = NATURE OF ADDRESS INDICATOR: INTERNATIONAL
NUMBER (0x04)
                CALLING PARTY DIGITS: 6281105190
                    CALLED OR CALLING GT DIGITS: 6281105190
                    NUMBER OF CALLING PARTY DIGITS: 10
                    COUNTRY CODE: 62 INDONESIA (REPUBLIC OF) (LENGTH 2)
```

*FIG. 11*

METHOD AND A DEVICE FOR SECURING A SIGNALLING SYSTEM NO. 7 INTERFACE

BACKGROUND

1. Field of the Invention

The invention relates to a method and a device for securing a Signalling System No. 7 Interface, SS7 Interface, which allows access to a local mobile radiocommunications network, in relation to an external system.

2. Description of the Related Art

Signalling System No. 7 (referred to below as SS7) was standardised in the 70s by the ITU and serves as a switching protocol to set up telephone connections.

SS7 is a collection of protocols and methods for signalling in telecommunications networks.

It is used in the public telephone network, in conjunction with ISDN, fixed-line and mobile radiocommunications networks and, since approximately 2000, also increasingly in VoIP networks. In VoIP networks, SS7 is only used in conjunction with Media Gateway controllers. The protocol collection is also known under other names such as Signalling System Number 7, Signalling System No. 7, Central Signalling System No. 7, ZZS7, CCITT Signalling System No. 7, Central Signalling System #7 and C7.

Detailed proposals for the implementation of national and international signalling networks are being developed by the ITU-T (earlier known as CCITT) under the designation "ITU-T Recommendation Q.xxx" in series Q.600 and Q.700. The proposals are translated by normative organisations such as ETSI (European Telecommunication Standardisation Institute) or ANSI (American National Standardisation Institute) and by IETF (Internet Engineering Task Force) by RFCs into binding standards.

SS7 is now the most common and often the only signalling system in national and international telecommunications networks. As a result of this popularity, various protocols of the SS7 sequence have been specified, developed and used for SS7oIP (Signaling System Over Internet Protocol).

Telecommunications devices such as switching devices or gateways operate with SS7 protocol sequences which are adapted to the national standards or requirements of the individual service providers. Like the majority of ITU-T recommendations, the Q.600 and Q.700 series have a very variable structure and allow a plurality of variations. Therefore, in contrast to the example of IP, there is no standardised SS7 protocol stack, but rather specific implementations.

SS7 is a central signalling system or "Common Channel Signalling System". A separate channel in a transmission system (normally a multiplex system) transmits the signalling information for all user channels (bearer channels) or telephone channels. This signalling information can contain, for example, information about called or calling numbers, charges, busy, call number unknown, etc.

SS7 is a highly efficient protocol which manages with comparatively small amounts of data in comparison to other types of communication.

In mobile communication networks, the signalling ratio is very high as a result of the mobility and the use of SMS. There are systems both in the fixed-line network, but above all in the mobile network, which have only signalling connections such as, for example, an SMS Center (SMSC).

SS7 provides methods for as rapid as possible troubleshooting and finding alternative paths. The switching times in the case of an error or in the event of a failure of a node are generally in the range of a few milliseconds.

The most important components of SS7 are recommendations which describe different partial aspects of the complex communication model (see FIG. 10):

MTP—Message Transfer Parts

MTP or Message Transfer Part describes how signalling information is transmitted. This includes definitions of the electrical or optical interfaces, details as to how individual messages are separated from one another and how individual switching devices or, to be precise, signalling points in the jargon of the ITU-T are addressed.

MTP Level 1 specifies the physical, electrical and functional parameters for a signalling link. This includes specifications such as clock rate, voltages, coding methods as well as the dimension and shape of the plug connector. Interfaces which correspond to the recommendations V.35 or G.703 are commonly used. Level 1 represents the bit transmission layer for a signalling link which, in a digital network, is normally composed of a 64-kbit/s channel.

MTP Level 2 specifies the methods for an error-free exchange of messages via a signalling link. This includes functions for activating or terminating the message connection, checking for errors and correcting them where necessary. The messages are separated from one another by flags. Level 2 is similar in structure to the frequently used HDLC procedure, but is expanded by several functions.

MTP Level 3 defines the interaction of several individual signalling links. All the aspects which are shared at a logistical level for the exchange of messages between two signalling points across several signalling links are dealt with. This includes passing on incoming messages to the desired signalling link. The separation of these functions in a separate level 3 also serves to administer the signalling network: Signalling links can be added or in the event of an error switched to a replacement path without the configuration having to be changed to higher, more abstract levels.

E1 LSL and HSL connections: E1 LSL have been used since the introduction of SS7. LSL (Low Speed Link) refers to the connections in which 64-kbit/s time slots are used. Since only 16 time slots can be shifted for each linkset, the bandwidth is correspondingly restricted. The results in a bandwidth of only 1 Mbit/s for each linkset. HSL (High Speed Link) has been specified for some time. HSL enables a bandwidth of 2 Mbit/s for each time slot which would produce a theoretical bandwidth of 32 Mbit/s for a linkset. HSL is used where the bandwidth with LSL is too small. Since, however, HSL is very expensive, HSL is only used if, for example, SS7oIP, the low-cost alternative, is not (yet) achievable as a result of an absence of connection possibilities in the network.

Linkset refers to the logical connection between two Signaling Point Codes (SPCs). Linksets are only used in the case of E1 connections, but not in the case of SS7oIP. The restriction to 16 time slots per linkset is not due to the missing bit for the SLC in ITU since the SLC (Signalling Link Code) only has 4 bits. However, 8 bits are available for the SLC in the ANSI standard, when then enables 256 time slots. If, however, more time slots (bandwidth) must be available between two pointcodes and HSL is not possible, a second linkset must be created. So that this can be enabled, a Capability Pointcode is set up in the Signalling Transfer Point (STP) which makes it possible to define a further linkset.

In the User Parts, the functions are described which are available to a user. These functions can be dependent on the service used (ISDN, analogue telephone, mobile radiocommunications) and are thus described separately. The most important User Parts are:

TUP Telephone User Part is the simplest User Part which only describes basic functions. This includes information such as establishing a connection (calling), terminating a connection (hanging up), busy or call number unknown.

ISUP ISDN User Part describes the functions which are available to ISDN users. This includes the description of the service or bearer capability as the most important element. ISDN makes it possible to operate various terminals such as telephone, fax or computer at the same connection. In the case of a connection in the ISDN, a description of the service type is always also transmitted so that only that terminal which also supports the desired service responds. As a result, it is, for example, prevented that a fax device attempts to start a speech connection if both terminals are ISDN-capable.

DUP Data User part is intended to transmit special information for data connections.

The most used part is currently ISUP.

Signalling Connection Control Part (SCCP) is a layer which is set at MTP Level 3 and enables an end-to-end signalling in the signalling network. Four service classes are available in the SCCP:

Class 0: Connection-free basic service: Longer messages can be split. Higher layers are then responsible for the correct composition of these parts Class 1: Connection-free service with sequential numbers: This number (SLS-Code) is 4 or 8 bits long (ITU-T or ANSI standard). Associated messages use the same SLS code. If several connections (linkset) are used for one message, the sequential number differs in the lowest value bits.

Class 2: Connection-oriented basic service: The signalling connection must be established and disconnected.

Class 3: Connection-oriented basic service with flow control

Transaction Capabilities Application Part (TCAP) is based on SCCP and enables the protocols above it such as, for example, INAP, CAP, MAP and OMAP to communicate worldwide via the SS7 network. This is explained below.

The functions for intelligent networks (IN) are dealt with via Intelligent Network Application Part (INAP). This includes, among other things, call number portability (LNP Local Number Portability) or 0800 numbers which are passed on to the next central office depending on the location of the caller.

CAMEL Application Part (CAP) is used in mobile radiocommunications networks and serves the purpose of Customised Applications for Mobile networks Enhanced Logic (CAMEL).

MAP (Mobile Application Part) serves the purpose of communication between the various components of the mobile radiocommunications network (among others HLR, VLR, SMSC). The standard can also be used for communication between mobile radiocommunications networks of various providers and is thus one of the requirements for roaming functionality. By means of roaming, a mobile radiocommunications subscriber can log into third-party networks (for example, foreign mobile operators with a roaming contract or in order to be able to make emergency calls even if the mobile radiocommunications subscriber is not in the area of coverage of his/her own provider). The accounting-relevant components are transmitted by Transferred Account Procedure (TAP).

Short Messages (SMS) are also transmitted in the MAP in addition to the roaming and the control of speech connections. Moreover, functions for identifying the device type and the IMEI are also transmitted in the MAP so that mobile telephone-specific configurations can be transmitted by the mobile operator to the terminal.

Operations, Maintenance and Administration Part (OMAP) is a function for operation, maintenance and administration comprising, for example, software maintenance, configuration and setting up call number blocks for telephone mobile radiocommunications terminal.

Figure 10:
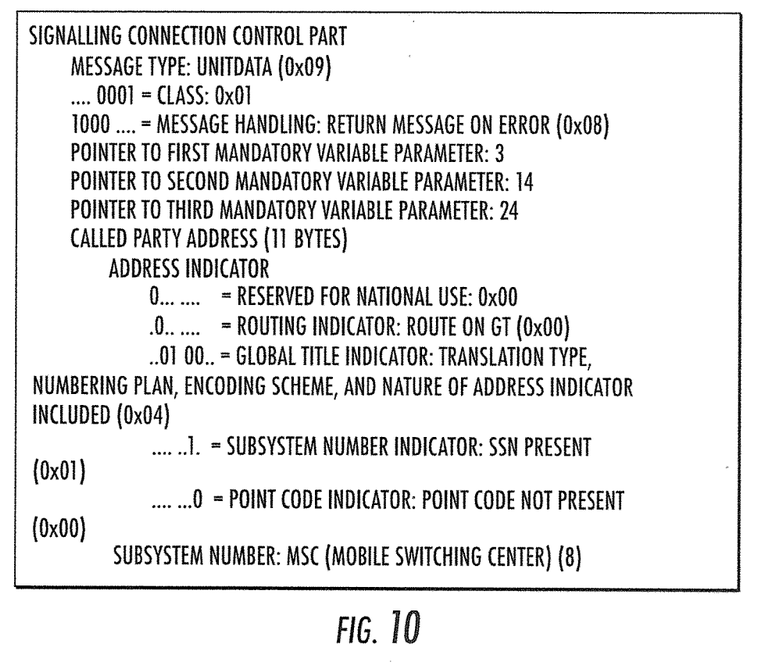
FIG. 10 is a layer model.

The layer model can be inferred from FIG. 10

Originally intended for signalling in the case of fixed-line network connections, SS7 was extended in the 80s and 90s by a large number of add-ons to support mobile radiocommunications networks, in order to enable, for example, SMS, Roaming, Prepaid and data traffic. In the mean time, it is no longer only the state telecommunications companies which have access to SS7, but also thousands of smaller companies and providers worldwide.

A protocol part of SS7 which is responsible for transmitting mobile communication is SS7/MAP (Mobile Application Part). SS7/MAP is used both within the network structure of a mobile radiocommunications provider and in the communications of mobile radiocommunications providers with one another, e.g. for roaming. Points of attack by external SS7 users are now provided at this point as a result of the historic development of the SS7 protocol and as a result of inadequate implementation of protection mechanisms in network elements. These can be used in the case of mobile radiocommunications providers to carry out fraud, infringe the private sphere of the mobile radiocommunications customer or even to listen into mobile radiocommunications conversations and also represent a security risk for the internal SS7 signalling networks of the mobile radiocommunications providers.

The Mobile Application Part (MAP) is an SS7 protocol which provides an application layer for the various nodes in GSM and UMTS mobile core networks and GPRS core networks in order to communicate with one another in order to be able to provide services for mobile users. The Mobile Application Part is the application layer which is used to be able to access the Home Location Register (HLR), Visitor Location Register (VLR), Mobile Switching Center (MSC), Equipment Identity Register (EIR), Authentication Centre (AuC), Short Message Service Center (SMSC) and Serving GPRS Support Node (SGSN).

The key facilities which are provided by MAP:

Mobility Services: Location management (to support roaming), authentication, administering subscription information of services, troubleshooting.

Operation and maintenance: Mobile radiocommunications participant retracing, calling a mobile radiocommunications participant IMSI.

Call administration: Routing, processing calls during roaming, checking whether a mobile radiocommunications terminal is available to receive calls.

Additional services.

Short Message Service.

Packet data protocol (PDP) services for GPRS: Providing routing information for GPRS connections.

Location Service Management Services: Getting the location of the mobile radiocommunications terminals.

The Mobile Application Part specifications which were originally defined by the GSM Association are now controlled by ETSI/3GPP. MAP is defined by two different standards depending on the mobile network type:

MAP for GSM (prior to release 4) specified by 3GPP TS 09.02

MAP for UMTS ("3G") and GSM (release 99 or higher) is specified by 3GPP TS 29.002

A similar protocol generally referred to as IS-41 or ANSI-41 (ANSI MAP) plays the role of MAP in mobile radiocommunications networks on the basis of ANSI standards (currently CDMA2000, in the last AMPS, IS-136 and cdmaOne). Since 2000, it is maintained by 3GPP2 as N.S0005 and has been called 3GPP2 X.S0004 since 2004.

MAP is a Transaction Capabilities Application Part (TCAP) user, and as such it can be transported with "traditional" SS7 protocols or via IP with transport-independent Signalling Connection Control Part (TI-SCCP) or with SIG-TRAN.

In mobile radiocommunications telephone networks such as GSM and UMTS, the SS7 application MAP is used. Speech connections are Circuit Switched (CS) and data connections are Packet Switched (PS) applications. The mobile terminal is also named ME. SCF stands for Service Control Function.

Some of the GSM/UMTS Circuit Switched interfaces in the mobile switching point (MSC), which are transported via SS7, comprise the following:

B→VLR (uses MAP/B). The majority of MSCs are assigned to a visitor register (VLR) such that the B interface is "internal".

C→HLR (uses MAP/C) the communications between MSC and HLR are dealt with by C interface D→HLR (uses MAP/D) for connection to the CS network and for location updates E→MSC (uses MAP/E) for inter-MSC relays F→EIR (uses MAP/F) for device identity checks H→SMSC (uses MAP/H) for Short Message Service (SMS) via CS I→ME (uses MAP/I) Communications between MSC and ME which are dealt with by the I interface.

J→SCF (uses MAP/J) Communications between HLR and gsmSCF were dealt with by J-interface.

There are also several GSM/UMTS PS interfaces in the Serving GPRS Support Node (SGSN) which are transported via SS7:

Gr→HLR for connection of the PS network and location updating

Gd→SMS-C for SMS via PS

Gs→MSC for combined CS+PS signalling via PS

Ge→The fees for Customised Applications for Mobile networks Enhanced Logic, Camel, prepaid loading Gf→EIR for the device identity check The listed functions make no claim to be complete, rather only describe the functionality which is described in detail below.

Due to the plurality of components, different network providers and also manufacturers, attacks on the network infrastructure of the mobile radiocommunications providers can come about.

SUMMARY OF THE INVENTION

Figure 1:
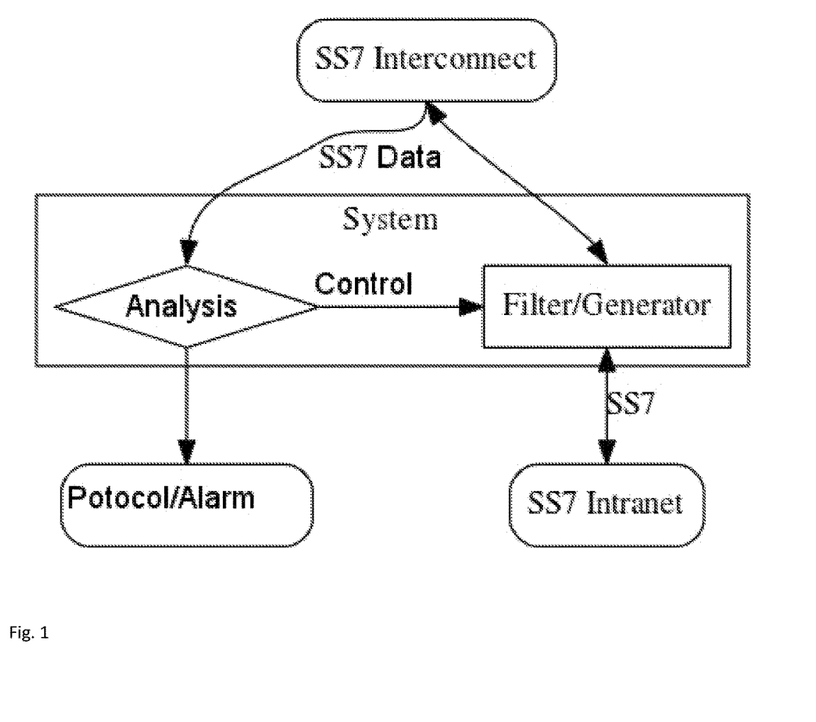
FIG. 1 shows a method for a protection system in the case of which the connection via the worldwide SS7 network to other telecommunications providers is carried out at an external SS7 interface, the SS7 interconnect.

The present invention describes a protection system which, by means of the combination of several methods, protects the SS7 network access points of telecommunications providers from SS7/MAP attacks by virtue of the fact that it detects and filters these.
(FIG. 1)

The characteristics of the present invention are determined by the attached claims.

In particular, a method for securing a system with a Signalling System No. 7 interface (SS7 interface) via which access to a local mobile radiocommunications network is carried out, in relation to an external system, comprising one or more of the following analysis steps:

a) Ascertaining whether an SS7/MAP-MSU, Signalling System No. 7 Mobile Application Part Message Signal Unit, uses admissible addresses within a plurality of protocol layers in the interconnect between mobile radiocommunications networks. If no admissible addresses are present, the SS7/MAP-MSU is rejected;
and/or b) Ascertaining whether a mobile radiocommunications subscriber is signalled by a mobile radiocommunications network R as present in this mobile radiocommunications network R in the interconnect between mobile radiocommunications networks, despite the fact that said subscriber is present in a different mobile radiocommunications network. If this is the case a request is rejected;
and/or c) Ascertaining whether an SS7/MAP-MSU was sent en masse to various network elements of a mobile radiocommunications network in the interconnect between mobile radiocommunications networks for the purpose of locating a mobile radiocommunications terminal. If this is the case, the SS7/MAP-MSU is rejected;
and/or d) Ascertaining whether an improper change in the mobile radiocommunications subscriber data is present by falsifying a sender address of SS7/MAP-MSUs in the interconnect between mobile radiocommunications networks. If this is the case, the SS7/MAP-MSU is rejected;
and/or e) Ascertaining the admissibility of an external system by checking the sender and receiver Global-Title of the SS7/MAP-MSU Request are all data requesting information over the SS7-Interface, especially requesting the identity and location information of mobile terminals.

In a further possible embodiment, in above step a), the SS7/MAP-MSUs which contain a request to a VLR (Visitor Location Register), MSC (Mobile Switching Center) or SGSN (Serving GPRS Support Node) are checked.

In a further possible embodiment, in above step a), a check of the type of address, preferably the SCCP Calling Address, of a sender in the transport layer is performed for one or more of the following features:

a. If the address does not contain a Global Title or a Numbering Plan or an Encoding Scheme or a Nature of Address Indicator, it is probably not a legitimate request;

b. If the Encoding-Scheme field is not set to BCD, Binary-coded decimal, it is probably not a legitimate request c. If the Nature-of-Address field is not set to "international number", it is probably not a legitimate request d. If the Numbering-Plan field is neither "ISDN/telephony numbering plan (ITU-T E.163 & E.164)" nor "land mobile numbering plan (ITU-T E.212)", it is probably not a legitimate request In a further possible embodiment, in above step a) of Claim 1, a determination of the transmitting mobile radiocommunications network is performed on the basis of a sender, preferably the SCCP Calling Address, in the transport layer, wherein one or more of the following steps are preferably carried out:

e. If the Numbering plan is set to "ISDN/telephony numbering plan (ITU-T E.163 and E.164)":
   i. Searching for start of the Global Title in the list of the telephony Country-Codes assigned by the ITU in order to determine the country of the mobile radiocommunications network;

ii. The following part of the Global Title should be searched for in a list of the Network Codes of all PLMNs, Public Land Mobile Networks, of the respective country so that a mobile radiocommunications network, O, is determined, f. If the Numbering plan is "land mobile numbering plan (ITU-T E.212)":

i. Searching for start of the Global Title in the list of the Mobile Country Codes, MCC, and Mobile Network Codes, MNC, of the ITU so that a mobile radiocommunications network O is determined;

and determining a home mobile radiocommunications network H of a mobile radiocommunications subscriber T, preferably by carrying out one or more of the following steps:

g. If the mobile radiocommunications subscriber T is addressed in an application layer via an IMSI: The first numbers of the IMSI also contain the MCC and MNC; the start of the IMSI is searched for in the list of the Mobile Country Codes, MMC, and Mobile Network Codes, MNC, of the ITU in order to thus determine the home mobile radiocommunications network H;

h. If the mobile radiocommunications participant T is addressed in the application layer via the MSISDN, the start of the MSISDN is searched for in the list of the Telephony-Country-Codes assigned by the ITU so that the country of the mobile radiocommunications network is determined, wherein a network operator group $H_1 \ldots H_n$ can be determined preferably via a predefined table and if mobile radiocommunications networks O and H are not identical, it is not a legitimate request and if O and H are identical or is O in $H_1 \ldots H_n$, it is probably a legitimate request.

In a further possible embodiment, in above step b) of Claim 1 it is recognised if a mobile radiocommunications network has signalled to the Home Location Register, HLR, of the home mobile radiocommunications network of a mobile radiocommunications subscriber by means of "sendAuthenticationInfo" and/or "updateLocation" request that this mobile radiocommunications subscriber is now present in the requesting mobile radiocommunications network, despite the fact that he or she is still present in the previous mobile radiocommunications network. To this end, it is ascertained by means of a "provideSubscriberInfo" request to the VLR, Visitor Location Register, in which the mobile radiocommunications subscriber was last present, whether he or she is still present there, and if this is the case, the request is rejected. Thereby, the following steps are carried out in order to ascertain whether the mobile radiocommunications subscriber is still present:

"sendAuthenticationInfo" and/or "updateLocation" request is transmitted by mobile radiocommunications network R relating to mobile radiocommunications subscriber T to the HLR H of the home mobile radiocommunications network;

the request is held back if it does not originate from the current VLR V;

the HLR H is asked for the address of the VLR V last responsible for mobile radiocommunications subscriber T;

a "provideSubscriberInfo" request is transmitted with the IMSI of the mobile radiocommunications subscriber T to the VLR V, thereby the field "currentLocation" is set;

the VLR V triggers a PagingRequest to the mobile radiocommunications terminal of the mobile radiocommunications subscriber T since the "currentLocation" was requested;

If the mobile radiocommunications subscriber T responds to the PagingRequest, the VLR V sets the "currentLocationRetrieved" field in its response; in this case, the original request of the mobile radiocommunications network R is clearly erroneous and is rejected; if the mobile radiocommunications subscriber T does not respond to the PagingRequest, the VLR V does not set the "currentLocationRetrieved" field in its response.

In a further possible embodiment, in above step b), the following steps are carried out in order to further check the plausibility of the original request: the information requested by the HLR H is immediately passed on to the remote VLR R, wherein by evaluation of the "ageOfLocationInformation" field:

i. Identifying how much time has passed since the mobile radiocommunications subscriber T last had contact with the VLR V, "ageOfLocationInformation";

j. Identifying how long in the most expedient case a journey from the country in which VLR V is geographically located to the country in which mobile radiocommunications network R is located would take, wherein approximate values which can be stored statically in a table would be adequate for the identification, k. If the time which has passed since the last contact of mobile radiocommunications subscriber T with the VLR V is shorter than the travel time required in the most expedient case, the original request of the mobile radiocommunications network R is clearly erroneous and is rejected; if this is not the case, the original request of mobile radiocommunications network R is probably justified and is passed on to the HLR H.

In a further possible embodiment, in above step c), it is decided on the basis of SS7/MAP-MSU for each time unit whether a request is admissible or is rejected, wherein comparison groups, operation groups and source groups should preferably be defined, wherein in the case of an incoming SS7/MAP-MSU initially the relevant comparison group is determined, then the SS7/MAP operation is assigned to an operation group, then one or more source groups are determined in order to then increase a counter for the tuple from source, operation and comparison group and then, if the counter has increased too rapidly in a specific period of time, to decide whether the SS7/MAP-MSU is rejected.

In a further possible embodiment, in above step c), it is ascertained whether requests in relation to a mobile radiocommunications subscriber are sent en masse to various VLR, Visitor Location Register, MSC, Mobile Switching, Center, or SGSN, Serving GPRS Support Node, by virtue of the fact that the time of each request and the IMSI of the mobile radiocommunications subscriber, or a unique identity derived therefrom, and the Global Title of a receiver are stored in a table for a defined period of time. If the number of the various receiver Global-Titles for an IMSI, or a unique identity derived therefrom, exceeds a defined threshold, this involves en masse queries to locate the relevant mobile radiocommunications terminal in the mobile radiocommunications network.

In a further possible embodiment, in above step d), an incoming TC-BEGIN is registered and buffered by a HLR H with an invoke for insertSubscriberData/deleteSubscriberData. The success of the request is communicated to the HLR H with TC-Continue and preferably the random otid— origination transaction id. Should no TC-END be sent by the caller, it is probably not a legitimate request. Should a TC-END come from the original caller, the buffered request is passed on to the actual VLR V.

In a further possible embodiment, in above step e), a sender and receiver Global-Title of each SS7/MAP-MSU is compared with a list W, whitelist, which is held internally and can be configured. If the sender or receiver Global-Title cannot be found in the list, this is not a legitimate request; and/or
the sender and receiver Global-Title of each MSU is compared with a list B, Blacklist, which is held internally and can be configured. If the sender or receiver Global-Title can be found in the list, this is not a legitimate request; and/or
the sender and receiver Global-Title of each MSU is compared with a list of all the Global Titles listed in all GSMA IR.21 documents of the roaming mobile radiocommunications networks of a mobile radiocommunication. If the sender or receiver Global-Title cannot be found in the list, this is probably not a legitimate request.

A further part of the invention is a method in order to transparently extract MTP/SCCP from M2PA-, M2UA-, M3UA- and SUA packets of an SCTP connection, with a system B which is arranged between two or more STPs/Gateways, wherein an STP/Gateway A establishes an IP/SCTP connection to system B. As a result system B establishes a connection to an STP/gateway C, wherein the protocol implementation takes place between the STP/Gateways A and C. Data packets between A and C are analysed by system B, the respective User-adaption determined and the MTP/SCCPPayload extracted.

A further part of the invention is a system characterised by a device and configuration which allows a procedure of the invented method.

It should fundamentally be noted that this system can be a conventional server with corresponding components such as a hard disc, random access memory, processors on which a known operating system runs such as, for example, Unix or Unix variants (Linux, FreeBSD) or Windows. As a result of these systems, it is possible to carry out a corresponding programming of the interfaces in order to provide a type of firewall which intercepts unauthorised data streams and detects anomalies. The data stream is recorded, analysed, where applicable modified or rejected via corresponding interfaces in order then to pass it on should it be admissible. This is carried entirely transparently for the majority of subscribers.

In order to simplify the description of the situation, below the term "mobile radiocommunications subscriber" is equivalent to the combination "mobile radiocommunications terminal of a mobile radiocommunications subscriber with its SIM card": all of the described methods identify the mobile radiocommunications subscriber via the identification feature of the SIM card, but not via specific information about the mobile radiocommunications terminal.

DETAILED DESCRIPTION

FIG. 1 shows a protection system in which the connection is performed via the worldwide SS7 network to other telecommunications providers at an external SS7 interface, the SS7 interconnect. Incoming SS7/MAP data are analysed according to the methods described below. Non-legitimate requests are rejected by a filter in the direction of the SS7 intranet and externally not answered or answered by means of a generated response depending on the method. The results of the analysis methods are logged. Where desired, the system can trigger an alarm to other systems about corresponding attacks. The system can optionally also be used so that it does not act as a filter system with respect to the SS7 intranet of the telecommunications supplier, rather only detects non-legitimate requests and logs them/issues an alarm.

Method A: Ascertaining whether an SS7/MAP-MSU (Message Signal Unit) according to ITU-T Q.703 in the interconnect between mobile radiocommunications networks is admissibly addressed, in particular whether the sender address and the receiver address are admissible. Should, in the case incoming SS7/MAP-MSUs, the transmitter address and, in the case of outgoing messages, the receiver address originate from the same mobile radiocommunications network to which the mobile radiocommunications subscriber belongs to which the MSU relates (see FIG. 2 in this regard).

Figure 2:
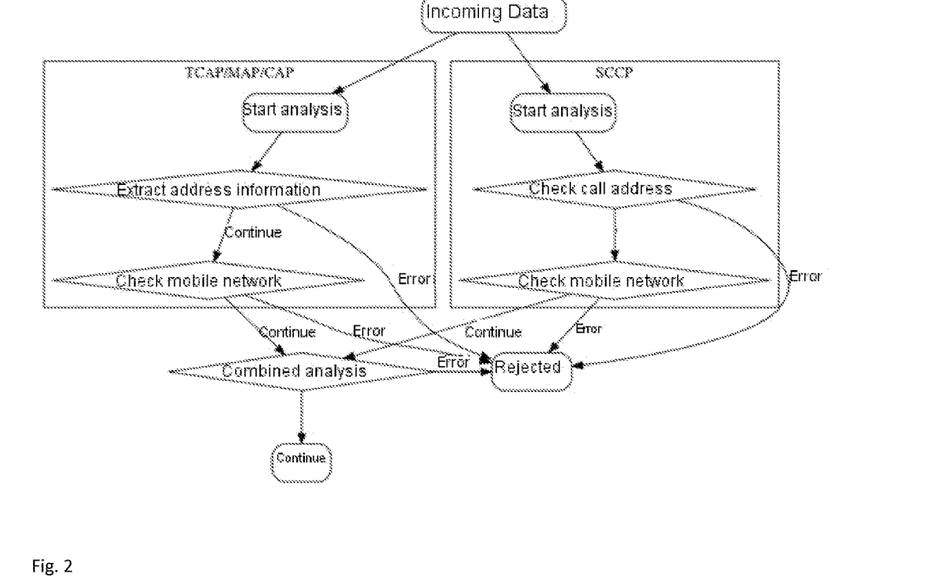
FIG. 2 shows a method which checks whether an SS7/MAP-MSU (Message Signal Unit) according to ITU-T Q.703 in the interconnect between mobile radiocommunications networks is admissibly addressed.

In order to ascertain whether a request in relation to a mobile radiocommunications subscriber, which is directed to a VLR (Visitor Location Register), MSC (Mobile Switching Center) or SGSN (Serving GPRS Support Node), originates from the home network of the mobile radiocommunications subscriber, the addresses in the respective SS7/MAP-MSU should be examined. In a SS7/MAP-MSU, address information can be added in various protocol layers. This requires a comparison of the address information in the various protocol layers.

Various types of addresses are used during routing of MSUs between mobile radiocommunications networks. A simple comparison of the addresses is therefore not sufficient. A special function/mapping is required for each type of address in order to be able to assign the address to the respective mobile radiocommunications network:

A request relating to the mobile radiocommunications subscriber T is transmitted via interconnect to a VLR or an MSC or a SGSN V in the mobile radiocommunications network to be observed Checking the type of address of the sender in the transport layer (SCCP Calling Address) for the following features (format according to ITU-T Q.713):

If the address does not contain a Global Title or a Numbering Plan or an Encoding Scheme or a Nature of Address Indicator, it is probably not a legitimate request If the Encoding-Scheme field is not set to BCD (Binary-coded decimal), it is probably not a legitimate request If the Nature-of-Address field is not set to "international number", it is probably not a legitimate request If the Numbering-Plan field is set neither to "ISDN/telephony numbering plan (ITU-T E.163 & E.164)" nor "land mobile numbering plan (ITU-T E.212)", it is probably not a legitimate request Determining the transmitting mobile radiocommunications network on the basis of the sender in the transport layer (SCCP Calling Address):

If the Numbering plan is set to "ISDN/telephony numbering plan (ITU-T E.163 and E.164)":

Searching for start of the Global Title in the list of the telephony Country-Codes issued by the ITU. The country of the mobile radiocommunications network is thus determined.

The subsequent part of the Global Title must be searched for in a list of the Network Codes of all the PLMNs (Public Land Mobile Networks) of the respective country. The mobile radiocommunications network operator O is thus determined If the Numbering plan is "land mobile numbering plan (ITU-T E.212)":

Searching for start of the Global Title in the list of the Mobile Country Codes (MCC) and Mobile Network Codes (MNC) of the ITU. The mobile radiocommunications network operator O is thus determined.

Determining the home network operator H of the mobile radiocommunications subscriber T:

If the mobile radiocommunications subscriber T is addressed in the application layer via the IMSI: The first numbers of the IMSI also contain the MCC and MNC. The start of the IMSI is searched for in the list of the Mobile Country Codes (MCC) and Mobile Network Codes (MNC) of the ITU. The home network operator H is thus determined.

If the mobile radiocommunications subscriber T is addressed in the application layer via the MSISDN: Searching for start of the MSISDN in the list of the telephony Country-Codes issued by the ITU. The country of the mobile radiocommunications network is thus determined. A network operator group $H_1 \ldots H_n$ can thus be determined via a predefined table in order to be able to decide at least approximately whether the mobile radiocommunications network operation O is in this network operator group.

If O and H are not identical, it is not a legitimate request

Figure 11:
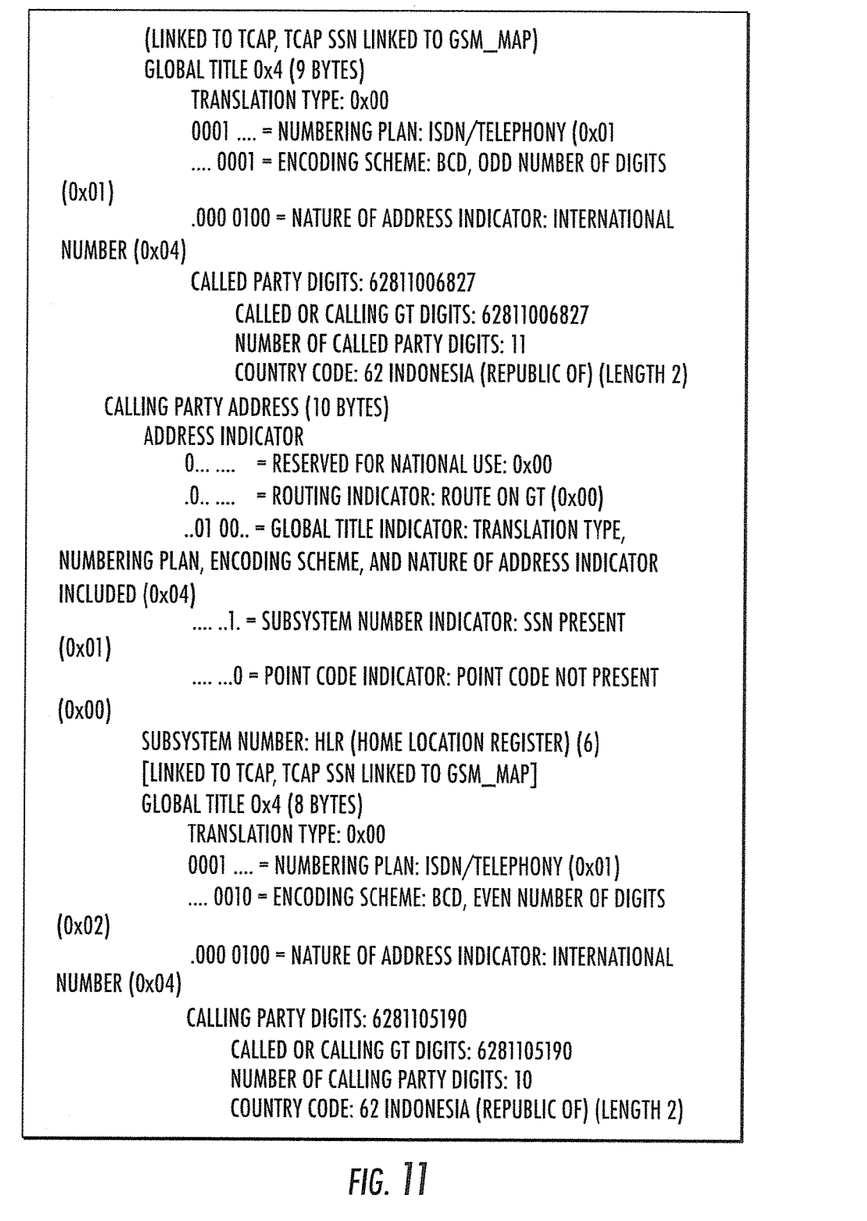
FIG. 11 is a recording as an example which contains corresponding SCCP address information with a legitimate request.

If O and H are identical or if O is in $H_1 \ldots H_n$, it is probably a legitimate request. In order to prevent the sender from being falsified, in cases where no answer is required, method D (see below) can be used FIG. 11 describes corresponding SCCP address information which contains the above-mentioned parameters such that the request is legitimate.

Figure 3:
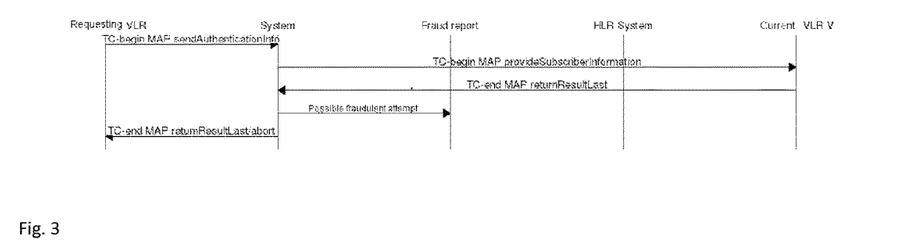
FIGS. 3 and 6 show a method in which a check is carried out as to whether a mobile radiocommunications subscriber T in the interconnect between mobile radiocommunications networks is signalled by a mobile radiocommunications network R as present in said mobile radiocommunications network R, despite the fact that it is present in a different mobile radiocommunications network V.
Figure 6:
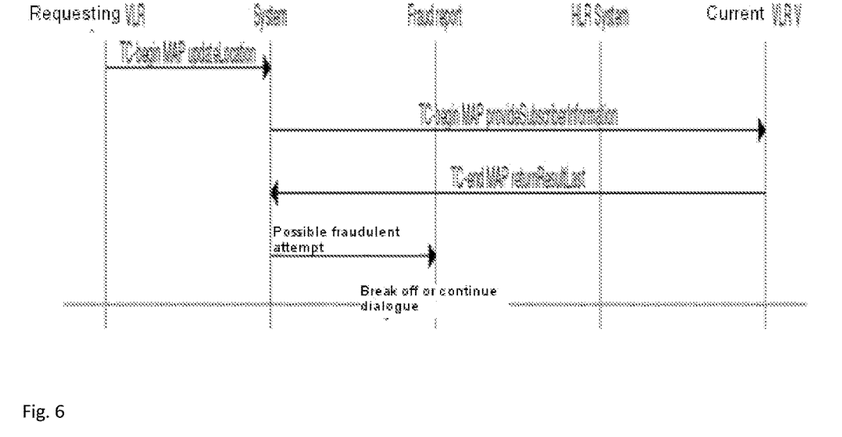

Method B: Check whether a mobile radiocommunications subscriber T in the interconnect between mobile radiocommunications networks is signalled by a mobile radiocommunications network R as present in said mobile radiocommunications network R, despite the fact that it is present in a different mobile radiocommunications network V ("intercept" method)

If a mobile radiocommunications network R signals to the HLR (Home Location Register) of the home mobile radiocommunications network of a mobile radiocommunications subscriber T by means of "sendAuthenticationInfo" and/or "updateLocation" request that this mobile radiocommunications subscriber T is now present in the requesting mobile radiocommunications network R, it can be ascertained by means of a "provideSubscriberInfo" request to the VLR (Visitor Location Register) V, in which the mobile radiocommunications subscriber T was last present, as to whether it is still present there:

"sendAuthenticationInfo" and/or "updateLocation" request from mobile radiocommunications network R relating to mobile radiocommunications subscriber T is transmitted to the HLR H of the home mobile radiocommunications network.

The request is held back if it does not originate from the current VLR V.

The HLR H is queried for the address of the VLR V last responsible for mobile radiocommunications subscriber T A "provideSubscriberInfo" request with the IMSI of the mobile radiocommunications subscriber T is transmitted to the VLR V. Here, the field "currentLocation" is set The VLR V triggers a PagingRequest to the mobile radiocommunications subscriber T since the "currentLocation" was requested If the mobile radiocommunications subscriber T responds to the PagingRequest, the VLR V sets the "currentLocationRetrieved" field in its response. In this case, the original request of the mobile radiocommunications network R is clearly erroneous and is rejected FIGS. 3 and 6 represent the method which has just been described for sendAuthenticationInfo or updateLocation If the mobile radiocommunications subscriber T does not respond to the PagingRequest, the VLR V does not set the "currentLocationRetrieved" field in its response. This generally takes longer than a timeout allows for responding to the sendAuthentication request. The system thus immediately transmits the information requested by the HLR H on to the remote VLR R. In order to further check the plausibility of the original request, the "ageOfLocationInformation" field of the response of the VLR V can be evaluated:

How much time has passed since the mobile radiocommunications subscriber T last had contact with the VLR V ("ageOfLocationInformation")

Figure 4:
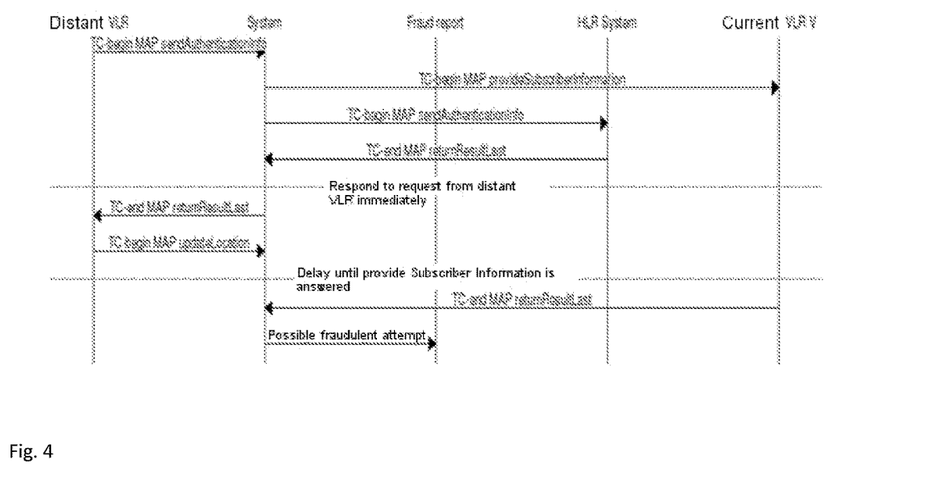
FIG. 4 shows a method in which the time between the last contact of the mobile terminal T to the VLR V is analysed.

How long in the most expedient case would a journey from the country in which VLR V is geographically located to the country in which mobile radiocommunications network R is geographically located take? Approximate values which can be stored statically in a table would be adequate for the identification If the time which has passed since the last contact of mobile radiocommunications participant T with the VLR V is shorter than the travel time required in the most expedient case, the original request of the mobile radiocommunications network R is clearly erroneous and is rejected. If this is not the case, the original request of the mobile radiocommunications network R is probably justified and is passed on to the HLR H The method which has just been described is used in FIG. 4: An updateLocation obtained in this context is held back by the VLR R from the system until it is decided by the above-mentioned method as to whether the request from VLR R is justified. If yes, it is passed on to the HLR H, if no, it is rejected and an attack alarm is issued.

Figure 5:
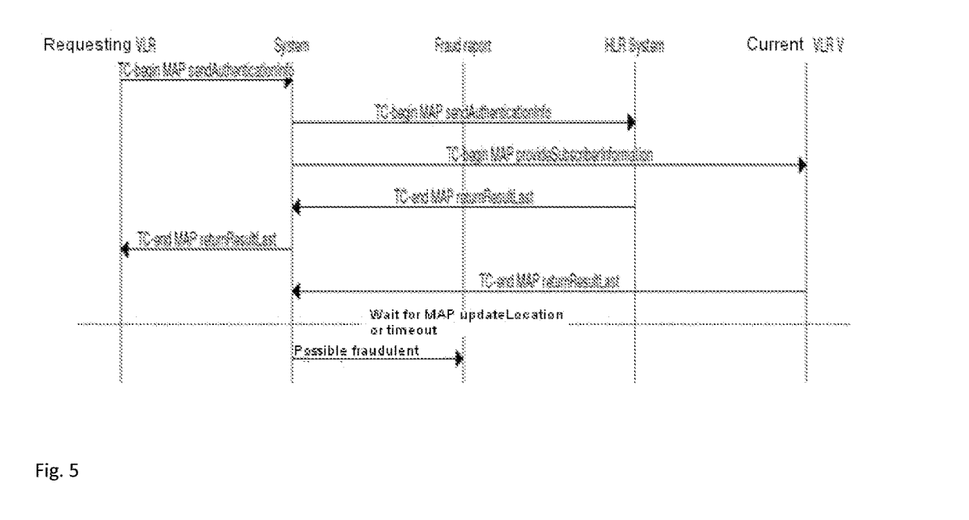
FIG. 5 indicates the case that a sendAuthenticationInfo was not sent by the current VLR and no updateLocation attempt occurred. An incident should then be reported.

If sendAuthenticationInfo was not sent by the current VLR and no updateLocation attempt was made, an incident should be reported: a new VLR (i.e. a VLR in which the mobile radiocommunications subscriber is newly logged in) must always send an updateLocation after a sendAuthenticationInfo. FIG. 5 illustrates this case, wherein this figure also represents the case that the current VLR R transmits a positive response (i.e. the mobile radiocommunications participant T is still logged on in the case of the VLR R) or the ageOfLocationInformation field allows one to assume on the basis of the evaluations represented above that the mobile radiocommunications subscriber cannot be realistically logged in in the case of the distant VLR.

Figure 9:
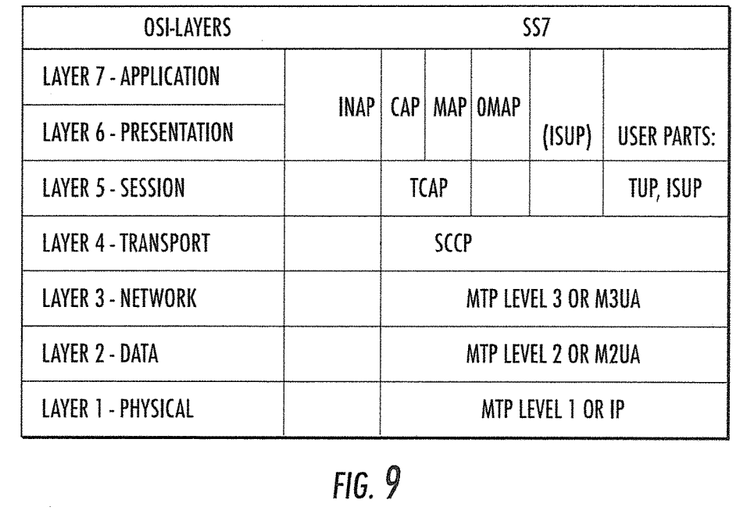
FIG. 9 Method C: ascertaining whether an SS7/MAP-MSU in the interconnect between mobile radiocommunications networks for the purpose of locating a mobile radiocommunications subscriber is transmitted en masse to various network elements of a mobile radiocommunications network ("ratelimit" method).

Method C: Ascertaining whether a SS7/MAP-MSU in the interconnect between mobile radiocommunications networks for the purpose of locating a mobile radiocommunications subscriber is transmitted en masse to various network elements of a mobile radiocommunications network ("ratelimit" method)

In a general form

The method described below is represented in FIG. 9.

It is possible to define comparison groups (match), operation groups and source groups A comparison group can be the equivalence class of the IMSIs or further subscriber criteria An operation group is one or more SS7/MAP operations A source group can be an individual Global Title, a Global-Title range or a Global-Title list. The source group can be combined with Sub-System-Numbers (SSN).

It is possible to define rules either with best-match or all-match.

Requests by day, by hour, by minute, by second or similar criteria are defined as "Rate-Limit".

In the case of an incoming SS7/MAP-MSU, the relevant comparison group is determined first Then one or more source groups are determined.

The counter of a tuple from source, operation and comparison group is first increased and then the "Rate-Limit" is applied.

After application of the Rate-Limit, an SS7/MAP-MSU can be rejected and/or a log event generated In one special embodiment, in order to ascertain whether requests in relation to a mobile radiocommunications subscriber are sent en masse to various VLR (Visitor Location Register), MSC (Mobile Switching Center) or SGSN (Serving GPRS Support Node), the time of each request and the IMSI of the mobile radiocommunications subscriber (or a unique identity derived therefrom) and the Global Title of the receiver are stored in a table for a defined period of time. If the number of the various receiver Global-Title for an IMSI exceeds a defined threshold, this involves en masse queries to locate the relevant mobile radiocommunications subscriber in the mobile radiocommunications network:

A request relating to the mobile radiocommunications subscriber T is transmitted via interconnect to a VLR or an MSC or a SGSN V in the mobile radiocommunications network to be observed The receiver address (SCCP Called Party Address) is stored from the transport layer of the request The IMSI is stored from the application layer of the request Both data are stored together with the current time in a database. If the receiver address for this IMSI (or a unique identity derived therefrom) is already stored, the entry is overwritten (i.e. only the time stamp is updated).

All entries with a time stamp older than the defined time span permitted for storing the entries are deleted If the number of entries for this IMSI exceeds a previously defined threshold, this involves en masse queries for locating the mobile radiocommunications subscriber T and the request can be rejected and/or a log event can be generated Method D: Preventing improper change of mobile radiocommunications subscriber data by falsifying the sender address of SS7/MAP-MSUs in the interconnect between mobile radiocommunications networks ("proxy" method)

Figure 7:
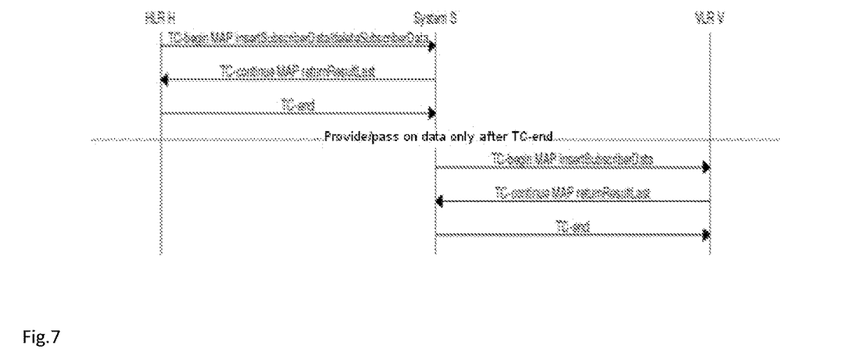
FIG. 7 This method protects a VLR V from illegitimate changes by an HLR H by means of a system S.

This method protects a VLR V from illegitimate changes by an HLR H by means of a system S and is represented in FIG. 7 and described as follows:

An active system S is used to prevent the operations insertSubscriberData/deleteSubscriberData from a false SCCP Calling Address. An incoming TC-BEGIN from a HLR H is registered and buffered with an invoke for insertSubscriberData/deleteSubscriberData. The success of the call is communicated to the HLR H with TC-Continue (and random otid—origination transaction id). Should no TC-END be sent by the caller, this is probably not a legitimate request. Should TC-END come from the original caller, the buffered request is passed on to the actual VLR V. A further possible method is Method E: Checking for legitimate network elements of a roaming partner. The sender and receiver Global-Title of each SS7/MAP-MSU is compared with a list W which is kept internally in the system and can be configured:

If the sender or receiver Global-Title cannot be found in the list, it is not a legitimate request ("Whitelist")

The sender and receiver Global-Title of each MSU is compared with a list B which is kept internally in the system and can be configured. If the sender or receiver Global-Title can be found in the list, it is not a legitimate request ("Blacklist")

The transmitter and receiver Global-Title of each MSU is compared with a list of all the Global Titles listed in all GSMA IR.21 documents of the Roaming-Partners of a network operator. If the transmitter or receiver Global-Title cannot be found in the list, it is most probably not a legitimate request.

Figure 8:
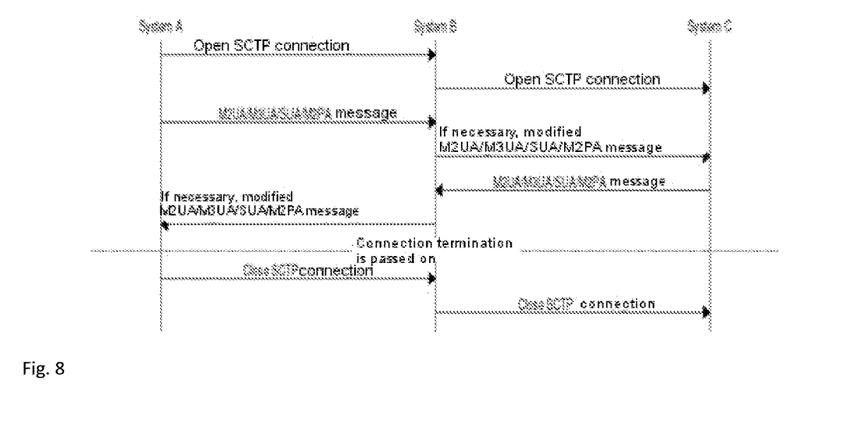
FIG. 8 Method E: Structure for receiving and processing MSUs ("read" method).

Method F: Structure for receiving and processing MSUs ("read" method)

A method is described in order to transparently extract MTP/SCCP from M2PA-, M2UA-, M3UA- and SUA packets of an SCTP connection, without implementing the respective state machine. FIG. 8 represents this method in a sequential diagram. To this end, the system (referred to here as system B) is placed between two or more STPs/Gateways. An STP/Gateway A establishes an IP/SCTP connection to system B. As a result, system B establishes a connection to an STP/gateway C. The protocol implementation takes place exclusively between the STP/Gateways A and C. Data packets between A and C are analysed, the respective user adaption determined and the MTP/SCCPPayload extracted. This can be processed, analysed and evaluated by system B. It is possible to introduce packets, modify or reject incoming packets on the connection between A and C.

What is claimed is:

1. A method for securing a Signalling System No. 7 (SS7) interface of a system, via which access to a local mobile radiocommunications network is carried out, in relation to an external system, which sends requests to the SS7 interface, comprising following analysis steps:
   a) ascertaining whether an SS7/MAP-MSU (Signalling System No. 7 Mobile Application Part Message Signal Unit) uses admissible addresses within a plurality of protocol layers in an interconnect between mobile radiocommunications networks, if no admissible addresses are present, the SS7/MAP-MSU is rejected, wherein a determination of a transmitting mobile radiocommunications network is carried out on the basis of a sender in a transport layer, wherein one or more of following steps are carried out:
      i) if a Numbering plan is set to "ISDN/telephony numbering plan (ITU-T E.163 and E.164)":
         1) searching for start of a Global Title in a list of the telephony Country-Codes assigned by the ITU in order to determine a country of the transmitting mobile radiocommunications network;
         2) searching for a subsequent part of the Global Title in a list of a Network Codes of all Public Land Mobile Networks (PLMNs) of a respective country so that a mobile radiocommunications network, O, is determined,
      ii) if the Numbering plan is "land mobile numbering plan (ITU-T E.212)":
         1) searching for start of the Global Title in the list of the Mobile Country Codes (MCC) and Mobile Network Codes (MNC) of the ITU so that the mobile radiocommunications network O is determined;
   and determining a home mobile radiocommunications network H of a mobile radiocommunications subscriber T by carrying out one or more of the following steps:
      iii) if the mobile radiocommunications subscriber T is addressed in an application layer via an IMSI: The first numbers of the IMSI also contain the MCC and MNC; a start of the IMSI is searched for in the list of the Mobile Country Codes, MMC, and Mobile Network Codes, MNC, of the ITU in order to thus determine a home mobile radiocommunications network H;
      iv) if the mobile radiocommunications participant T is addressed in the application layer via the Mobile Station International Subscriber Directory Number (MSISDN), the start of the MSISDN is searched for in the list of the telephony Country-Codes assigned by the ITU so that the country of the mobile radiocommunications network is determined, wherein a network operator group H1 . . . Hn are determined via a predefined table,
   and if mobile radiocommunications networks O and H are not identical, it is not a legitimate request and if O and H are identical or if O is in H1 . . . Hn, it is a legitimate request;
   b) ascertaining whether a mobile radiocommunications subscriber is signalled as being present in a mobile radiocommunications network R, despite the fact that said mobile radio communications subscriber is present in a different mobile radiocommunications network, if the mobile radiocommunications subscriber is signalled as being present in the mobile radiocommunications network R despite that the mobile radiocommunications subscriber is present in a different mobile radiocommunications network, a request is rejected, wherein it is recognized if a mobile radiocommunications network has signalled to a Home Location Register (HLR) of a home mobile radiocommunications network of a mobile radiocommunications subscriber by means of at least one of a "sendAuthenticationInfo" or "updateLocation" request that a mobile radiocommunications terminal is now present in the requesting mobile radiocommunications network, it is ascertained by means of a "provideSubscriberInfo" request to a Visitor Location Register (VLR) in which the mobile radiocommunications subscriber was last present, whether the mobile radiocommunications subscriber is still present in the Visitor Location Register (VLR), and if the mobile radiocommunications subscriber is still present in the Visitor Location Register (VLR), then the Visitor Location register (VLR) is determined to be an actual Visitor Location Profile (VLR V) and the request is rejected;
   c) ascertaining whether an SS7/MAP-MSU was sent en masse to various network elements of a mobile radiocommunications network in the interconnect between mobile radiocommunications networks for the purpose of locating the mobile radiocommunications terminal, if the SS7/MAP-MSU is ascertained to have been sent en masse to various network elements of a mobile radiocommunications network in the interconnect between mobile radiocommunications networks for the purpose of locating the mobile radiocommunications terminal, then the SS7/MAP-MSU is rejected;
   d) ascertaining whether an unauthorized change in mobile radiocommunications subscriber data is present by falsifying a sender address of SS7/MAP-MSUs in the interconnect between mobile radiocommunications networks, if the unauthorized change is present, the SS7/MAP-MSU is rejected, wherein an incoming TC-BEGIN with an invoke for insertSubscriberData/deleteSubscriberData by a HLR H is registered and buffered, a success of the request is communicated to the HLR H with TC-Continue and the random origination transaction id (otid), should no TC-END be sent by a caller, it is not a legitimate request, should a TC-END come from an original caller, the buffered request is passed on to the actual VLR V.

2. The method of claim 1, wherein in step a) of claim 1 the SS7/MAP-MSU contains a request to the VLR (Visitor Location Register), MSC (Mobile Switching Center) or SGSN (Serving GPRS Support Node).

3. The method of claim 1, wherein in step a) a check of an address of a sender in a transport layer is performed for one or more of the following features:

a. If the address does not contain a Global Title or a Numbering Plan or an Encoding Scheme or a Nature of Address Indicator, it is not a legitimate request;
b. If an Encoding-Scheme field is not a BCD, Binary-coded decimal, it is not a legitimate request;
c. If a Nature-of-Address field is not set to "international number", it is not a legitimate request;
d. If a Numbering-Plan field is neither "ISDN/telephony numbering plan (ITU-T E.163 & E.164)" nor "land mobile numbering plan (ITU-T E.212)", it is not a legitimate request.

4. The method of claim 3, wherein the address is a Signalling Connection Control Part (SCCP) calling address.

5. The method of claim 1, wherein the following steps are carried out to ascertain whether the mobile radiocommunications subscriber is still present:
the at least one of "sendAuthenticationInfo" and/or "updateLocation" request is transmitted by mobile radiocommunications network R relating to mobile radiocommunications subscriber T to the HLR H of the home mobile radiocommunications network;
the request is held back if it does not originate from the current VLR V;
the HLR H is queried for the address of the VLR V last responsible for mobile radiocommunications subscriber T;
a "provideSubscriberInfo" request is transmitted with a IMSI of the mobile radiocommunications terminal T to the VLR V, thereby the field "currentLocation" is set;
the VLR V triggers a PagingRequest to the mobile radiocommunications terminal T since the "currentLocation" was requested;
If the mobile radiocommunications subscriber T responds to the PagingRequest, the VLR V sets the "currentLocationRetrieved" field in its response; and an original request of the mobile radiocommunications network R is deemed clearly erroneous and is rejected;
if mobile radiocommunications terminal T does not respond to the PagingRequest, the VLR V does not set the "currentLocationRetrieved" field in its response.

6. The method of claim 5, wherein the following steps are carried out in order to further check the plausibility of the original request: the information requested by the HLR H is immediately passed on to the remote VLR R, wherein by evaluation of a "ageOfLocationInformation" field:
a. Identifying how much time has passed since the mobile radiocommunications participant T last had contact with the VLR V, "ageOfLocationInformation";
b. Identifying shortest possible time required for a journey from the country in which VLR V is geographically located to the country in which mobile radiocommunications network R is located would take, wherein approximate values which are stored statically in a table would be adequate for the identification,
c. If the time which has passed since a last contact of mobile radiocommunications subscriber T with the VLR V is shorter than the shortest possible time required for a journey from the country in which VLR V is geographically located to the country in which mobile radiocommunications network R is located, the original request of mobile radiocommunications network R is clearly erroneous and is rejected; if this is not the case, the original request of mobile radiocommunications network R is justified and is passed on to the HLR H.

7. The method of claim 1, wherein in step c) of claim 1, it is decided on the basis of SS7/MAP-MSU for each time unit whether a request is admissible or is rejected, wherein comparison groups, operation groups and source groups are defined, wherein in the case of an incoming SS7/MAP-MSU initially the relevant comparison group is determined, then the SS7/MAP operation is assigned to an operation group, then one or more source groups are determined in order to then increase a counter for a tuple from source, operation and comparison group and then, if the counter has increased too rapidly in a specific period of time, to decide whether the SS7/MAP-MSU is rejected.

8. The method of claim 1, wherein in step c) of claim 1, it is ascertained whether requests in relation to a mobile radiocommunications participant are sent en masse to various VLR, Visitor Location Register, MSC, Mobile Switching, Center, or SGSN, Serving GPRS Support Node, by virtue of the fact that a time of each request and a IMSI of the mobile radiocommunications subscriber, or a unique identity derived therefrom, and a Global Title of a receiver are stored in a table for a defined period of time, if thereby a number of the various receiver Global-Titles for an IMSI, or a unique identity derived therefrom, exceeds a defined threshold, this involves en masse queries to locate the relevant mobile radiocommunications terminal in the mobile radiocommunications network.

9. The method of claim 1, further comprising ascertaining if an external system is allowed to send SS7/MAP-MSUs by checking the sender and receiver Global-Title of the SS7/MAP-MSU, wherein a sender and receiver Global-Title of each SS7/MAP-MSU compared with a whitelist (W) which is held internally and is configurable, if;
a sender or receiver Global-Title cannot be found in the whitelist, this is not a legitimate request;
the sender and receiver Global-Title of each MSU is compared with a blacklist (B), which is held internally and is configured, if the sender or receiver Global-Title is found in the list, this is not a legitimate request;
and/or
the sender and receiver Global-Title of each MSU is compared with a list of all the Global Titles listed in all GSMA IR.21 documents of the roaming mobile radiocommunications networks of a mobile radiocommunication, the sender or receiver Global-Title cannot be found in the list of the Network Codes, this is not a legitimate request.

10. The method of claim 1, in order to transparently extract Message Transfer Part/Signalling Connection Control Part (MTP/SCCP) from MTP 2 User Peer-to-Peer Adaptation Layer (M2PA), MTP 2 User Adaptation Layer (M2UA), MTP 3 User Adaptation Layer (M3UA) and SCCP User Adaptation Layer (SUA) packets of an Stream Control Transmission Protocol (SCTP) connection, with a system B which is arranged between two or more STPs/Gateways, wherein an STP/Gateway A establishes an IP/SCTP connection to system B, as a result system B establishes a connection to an STP/gateway C, wherein the protocol implementation takes place between the STP/Gateways A and C, data packets between A and C are analysed by system B, the respective user adaption determined and the MTP/SCCP-Payload extracted.

11. The method of claim 1, wherein in step a) of claim 1, the sender is a Signalling Connection Control Part (SCCP) calling address.

12. A system comprising a memory that stores instructions and further comprising at least one processor for carrying out the instructions stored in the memory for carrying out a method that comprises:
a) ascertaining whether an SS7/MAP-MSU (Signalling System No. 7 Mobile Application Part Message Signal Unit) uses admissible addresses within a plurality of protocol layers in an interconnect between mobile radiocommunications networks, if no admissible addresses are present, the SS7/MAP-MSU is rejected, wherein a determination of a transmitting mobile radiocommunications network is carried out on the basis of a sender in a transport layer, wherein one or more of following steps are carried out:
  i) if a Numbering plan is set to "ISDN/telephony numbering plan (ITU-T E.163 and E.164)":
    1) searching for start of a Global Title in a list of the telephony Country-Codes assigned by the ITU in order to determine a country of the transmitting mobile radiocommunications network;
    2) searching for a subsequent part of the Global Title in a list of a Network Codes of all Public Land Mobile Networks (PLMNs) of a respective country so that a mobile radiocommunications network, O, is determined,
  ii) if the Numbering plan is "land mobile numbering plan (ITU-T E.212)":
    1) searching for start of the Global Title in the list of the Mobile Country Codes (MCC) and Mobile Network Codes (MNC) of the ITU so that a mobile radiocommunications network O is determined;
and determining a home mobile radiocommunications network H of a mobile radiocommunications subscriber T by carrying out one or more of the following steps:
  iii) if the mobile radiocommunications subscriber T is addressed in an application layer via an IMSI: The first numbers of the IMSI also contain the MCC and MNC; a start of the IMSI is searched for in the list of the Mobile Country Codes, MMC, and Mobile Network Codes, MNC, of the ITU in order to thus determine a home mobile radiocommunications network H;
  iv) if the mobile radiocommunications participant T is addressed in the application layer via the Mobile Station International Subscriber Directory Number (MSISDN), the start of the MSISDN is searched for in the list of the telephony Country-Codes assigned by the ITU so that the country of the mobile radiocommunications network is determined, wherein a network operator group H1 . . . Hn are determined via a predefined table,
and if mobile radiocommunications networks O and H are not identical, it is not a legitimate request and if O and H are identical or if O is in H1 . . . Hn, it is a legitimate request;
b) ascertaining whether a mobile radiocommunications subscriber is signalled as being present in a mobile radiocommunications network R, despite that said mobile radio communications subscriber is present in a different mobile radiocommunications network, if the mobile radiocommunications subscriber is signalled as being present in the mobile radiocommunications network R despite that the mobile radiocommunications subscriber is present in a different mobile radiocommunications network, a request is rejected, wherein it is recognized if a mobile radiocommunications network has signalled to a Home Location Register (HLR) of a home mobile radiocommunications network of a mobile radiocommunications subscriber by means of at least one of a "sendAuthenticationInfo" or "updateLocation" request that a mobile radiocommunications terminal is now present in the requesting mobile radiocommunications network, it is ascertained by means of a "provideSubscriberInfo" request to a Visitor Location Register (VLR) in which the mobile radiocommunications subscriber was last present, whether the mobile radiocommunications subscriber is still present in the Visitor Location Register (VLR), and if this mobile radiocommunications subscriber is still present the Visitor Location Register (VLR), then the Visitor Location register (VLR) is determined to be an actual Visitor Location Profile (VLR V) and the request is rejected;
c) ascertaining whether an SS7/MAP-MSU was sent en masse to various network elements of a mobile radiocommunications network in the interconnect between mobile radiocommunications networks for the purpose of locating a mobile radiocommunications terminal, if the SS7/MAP-MSU is ascertained to have been sent en masse to the various network elements of a mobile radiocommunications network in the interconnect between mobile radiocommunications networks for the purpose of locating the mobile radiocommunications terminal, then the SS7/MAP-MSU is rejected;
d) ascertaining whether an unauthorized change in mobile radiocommunications subscriber data is present by falsifying a sender address of SS7/MAP-MSUs in the interconnect between mobile radiocommunications networks, if the unauthorized change is present, the SS7/MAP-MSU is rejected, wherein an incoming TC-BEGIN with an invoke for insertSubscriberData/deleteSubscriberData by a HLR H is registered and buffered, a success of the request is communicated to the HLR H with TC-Continue and the random origination transaction id (otid), should no TC-END be sent by a caller, it is not a legitimate request, should a TC-END come from an original caller, the buffered request is passed on to the actual VLR V.

* * * * *